UNITED STATES PATENT OFFICE.

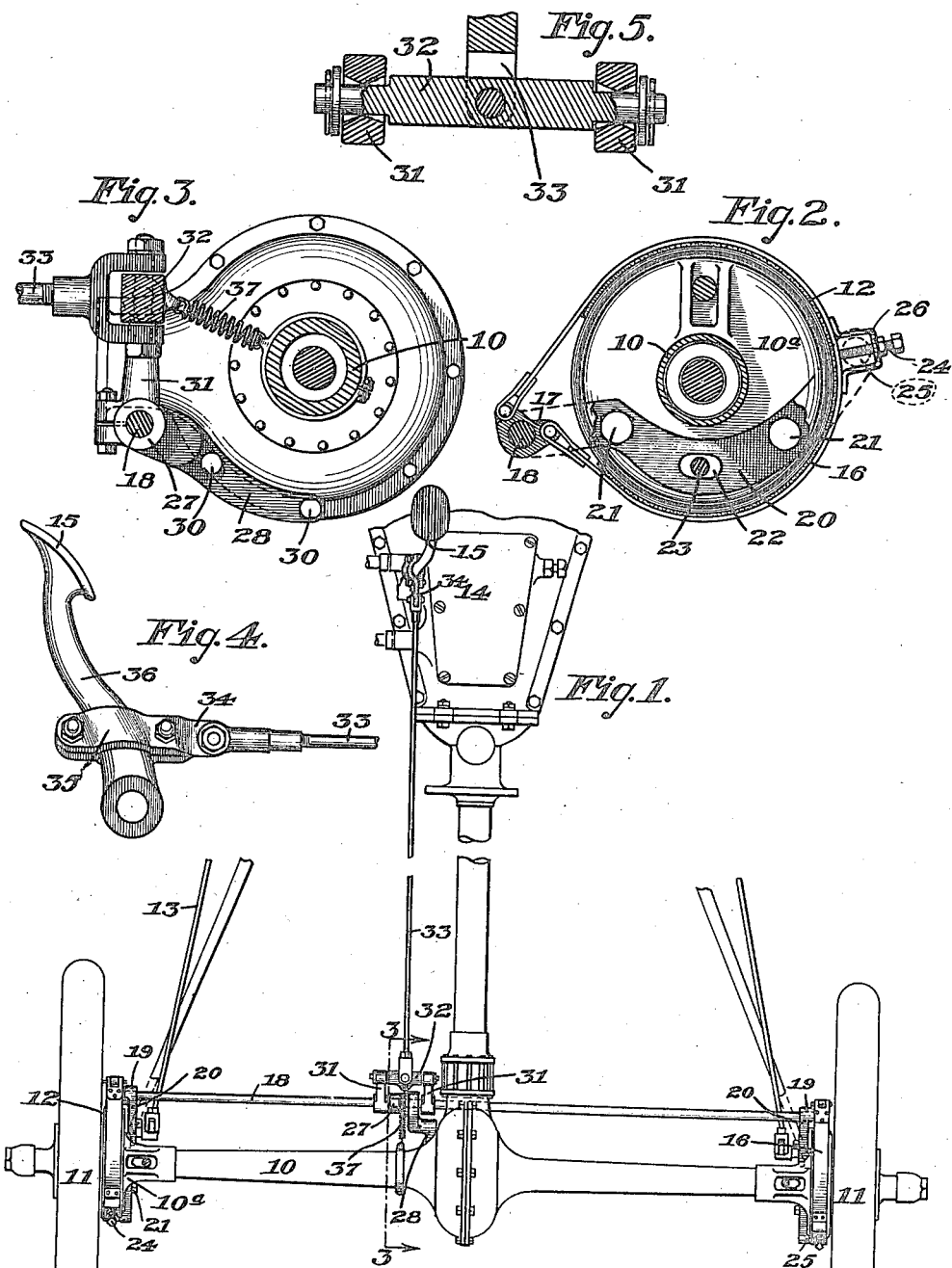

FLOYD J. MANNING, OF SAN FRANCISCO, CALIFORNIA.

BRAKE ATTACHMENT FOR AUTOMOBILES.

1,269,294.        Specification of Letters Patent.        Patented June 11, 1918.

Application filed November 15, 1915, Serial No. 61,482. Renewed October 28, 1916. Serial No. 128,346.

*To all whom it may concern:*

Be it known that I, FLOYD J. MANNING, a citizen of the United States, residing at the city and county of San Francisco and State of California, have invented new and useful Improvements in Brake Attachments for Automobiles, of which the following is a specification.

This invention relates to brake attachments for automobiles; and has for its object to provide a simple, efficient and easily attachable external contracting friction brake for a particular type of automobile and apply the same to brake drums and controlling levers already in place.

In a type of automobile now in extensive use a foot pedal operates the main brake which is applied to the transmission parts adjacent to the engine, and the strain is thus thrown upon the drive-shaft, differential and axle to such an extent as to injure those parts; and, moreover, being indirect in its operation the braking action is insecure and uncertain. Such automobiles employ internal expanding emergency brakes operated by a hand lever; the drums therefor being carried as usual upon the rear wheels. Accordingly, to effect a better acting and more secure brake and to prevent injury to the operating parts of the automobile, I apply external friction bands to the drums already in place and connect them operatively to rock-shafts carried in bearings detachably received upon the housings for the drums. I also employ an equalizing bar between the rock-shafts, and support the adjacent ends of said rock-shafts in a bearing carried by an arm detachably connected to the differential housing of the automobile.

The equalizing bar I connect, pivotally, to a forwardly extending tension rod, which rod is in turn pivotally connected to a specially constructed strap detachably carried upon the foot pedal of the usual transmission brake, said transmission brake being thereupon loosened to prevent its operation when the foot pedal is moved to set the newly attached wheel brakes.

One form which my invention may assume is exemplified in the following description and illustrated in the accompanying drawing, in which—

Figure 1 shows a plan view of the rear portion of an automobile and the transmission casing having my improved brake attachment applied thereto.

Fig. 2 shows a transverse, sectional view of the rear axle of the automobile, looking in a direction toward the adjacent brake drum, which drum is provided with my improved brake attachment.

Fig. 3 shows a transverse, sectional view, taken on line 3—3 of Fig. 1.

Fig. 4 shows a detail view, in side elevation, of the usual foot pedal provided with my improved connection for the brake attachment.

Fig. 5 shows a detail sectional view of the equalizing bar and its connections.

In the drawing I have shown the rear axle housing 10 and wheels 11 of an automobile, the latter each carrying a brake drum 12, within which is an internal expanding brake covered at its inside face by means of a housing 10$^a$ mounted upon the axle housing. The internal expanding brakes are operated in the well-known way by means of forwardly extending links 13 connected to the usual hand lever (not shown) and are provided for the purpose of emergency. The transmission casing 14 is shown as carrying a foot pedal 15, which is intended originally to operate a transmission brake carried within the casing in a manner well-known. These parts just described are as found originally in the type of automobile in question and constitute the framework to which my improved brake attachment is applied.

As shown in Fig. 2, I mount upon each of the drums 12 an external contracting brake 16 comprising in its simplest form a friction strap encircling the drum and connected at its ends to a rock-arm 17 carried fixedly upon a rock-shaft 18. Each of said rock-shafts is journaled at its outer end in a bearing 19 carried upon a bracket 20, said bracket having a downwardly curved body portion lying below the axle and carried upon the housing 10$^a$ by means of bolts 21 already in place thereon, which bolts were originally provided for the purpose of connecting the parts of the internal brake to said housing.

If desired, a slot 22 may be formed in the body portion of said bracket to permit a truss rod 23 to extend therefrom where the rear axle is fitted with such a device. Preferably, I provide an adjusting device or tightener for each of the brake bands 16, which is in the form of a set-screw 24 seated in a right angular extension 25 formed on the rear end of the bracket 20. The screw 24 has adjustably mounted thereon a yoke 26 adapted to engage with the brake band and force the same toward the drum when the screw is turned into its socket.

The rock-shafts 18 extend inwardly to a position where their ends approximately abut each other, and at this point a bearing 27 is provided, which bearing is carried upon an offset supporting arm 28 fastened to the differential housing 29 by means of bolts 30 already in place thereon. Fixed to the end of each rock-shaft is an upstanding arm 31, said arms carrying at their upper ends an equalizing bar 32 pivotally connected between them. An offset rod 33 is pivoted centrally upon said equalizing bar and extends forwardly beneath the body of the automobile to a point adjacent to the foot pedal 15, where a strap 34 with an angular split head 35 connects the same pivotally with the slanted leg portion 36 of the foot pedal.

In operation, with my improved brake attachment applied to an automobile, the transmission brake is preferably loosened so as not to engage except on an extended movement of the foot pedal, or, if desired, the said transmission brake may be permanently disconnected from the foot pedal. A forward actuation of said foot pedal draws the tension rod 33 forwardly and actuates the rock-shafts 18 through the agency of the equalizing bar 32, thereby setting the brake bands on both drums with equal pressure. A spring 37 is applied to the equalizing bar, or the foot pedal or other portion of the brake, for the purpose of disengaging the brake bands when the foot pedal is released by the operator. Should any obstacle interfere with the operation of any one of the brake bands or the wear upon them become unequal, with respect to the other band, the equalizing bar will take up the difference and, moreover, the set-screws 24 will permit adjustment of the bands to suit the conditions of wear.

The attachment of the parts of my improved device is obviously a simple matter, requiring no drilling of holes in the different parts of the automobile or the use of special tools to apply the same in use. Therefore, these brakes may be sold as an attachment and put in place by an unskilled user.

The main advantages of a device of this character reside in preventing injury to the drive-shaft, axle and other parts of the automobile by dispensing with the transmission brake and in the provision of a direct acting brake for the rear wheels operated by the main brake pedal already in place upon the automobile.

It is obvious that changes in the details of the various parts of my device may be employed without departing from the spirit of my invention as disclosed in the appended claims.

Having thus described my invention, what I claim and desire to secure by Letters Patent is—

1. In combination with the rear axle and the supporting wheels of an automobile, said wheels having the usual friction drums, a brake band encircling each drum, a two-part shaft, a bracket supporting the inner ends of the shaft parts, a rock-arm fixed on the outer end of each shaft part and connected to the adjacent brake band, an arm fixed on the inner end of each shaft part and formed with a flared opening, an equalizing bar having end trunnions engaged in the flared openings of the last arms, and operating means connected to the equalizing bar.

2. A brake for an automobile having the usual rear axle and supporting wheels, comprising friction drums carried by the wheels, external contracting brake bands coöperating with the drums, brackets supported on the housings for said drums and extending forwardly thereof, rock-shafts having operative connections with said brake bands journaled in said brackets and extending inwardly with their adjacent ends abutting each other, an elongated bearing for the adjacent ends of said rock-shafts, an offset support for said bearing carried detachably upon the differential housing of the automobile, upwardly extending arms on the adjacent ends of said rock-shafts, each arm having an aperture tapered inwardly from each side of the arm, an equalizing bar pivotally engaging in the apertures of said arms, and a tension rod pivoted centrally upon said equalizing bar, and means for actuating said tension rod to operate the rock-shafts and control said brakes.

3. In combination with the rear axle and the supporting wheels of an automobile, said wheels having the usual friction drums, a brake band encircling each drum, a two-part shaft, a bracket supporting the inner ends of the shaft parts, a rock-arm fixed on the outer end of each shaft part and connected to the adjacent brake band, an apertured arm fixed on the inner end of each shaft part, an equalizing bar having end trunnions engaged in the apertures of the last arms, and operating means connected to the equalizing bar.

4. A brake for an automobile having the usual rear axle and supporting wheels, comprising friction drums carried by the wheels, external contracting brake bands coöperating with the drums, brackets supported on the housings for said drums and extending forwardly thereof, rock-shafts having operative connections with said brake bands journaled in said brackets and extending inwardly with their adjacent ends abutting each other, an elongated bearing for the adjacent ends of said rock-shafts, an offset support for said bearing carried detachably upon the differential housing of the automobile, upwardly extending apertured arms on the adjacent ends of said rock shafts, an equalizing bar pivotally engaging in the apertures of said arms, and a tension rod pivoted centrally upon said equalizing bar, and means for actuating said tension rod to operate the rock shafts and control said brakes.

In testimony whereof I have hereunto set my hand in the presence of two subscribing witnesses.

FLOYD J. MANNING.

Witnesses:
JOHN H. HERRING,
W. W. HEALEY.